United States Patent
Lu et al.

(10) Patent No.: US 8,204,218 B2
(45) Date of Patent: Jun. 19, 2012

(54) HIGH-EFFICIENT ENCRYPTION AND DECRYPTION PROCESSING METHOD FOR IMPLEMENTING SMS4 ALGORITHM

(75) Inventors: Jiayin Lu, Shaanxi (CN); Jun Cao, Shaanxi (CN); Zhenhai Huang, Shaanxi (CN); Xiang Yan, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 756 days.

(21) Appl. No.: 12/375,095

(22) PCT Filed: Jul. 19, 2007

(86) PCT No.: PCT/CN2007/070323
§ 371 (c)(1),
(2), (4) Date: Jan. 26, 2009

(87) PCT Pub. No.: WO2008/017261
PCT Pub. Date: Feb. 14, 2008

(65) Prior Publication Data
US 2009/0323930 A1    Dec. 31, 2009

(30) Foreign Application Priority Data

Jul. 31, 2006    (CN) .......................... 2006 1 0104431

(51) Int. Cl.
*H04K 1/00*    (2006.01)
(52) U.S. Cl. ........................................................ 380/28
(58) Field of Classification Search ..................... 380/28
See application file for complete search history.

(56) References Cited

FOREIGN PATENT DOCUMENTS

| CN | 1429464 A | 7/2003 |
|---|---|---|
| CN | 1527531 A | 9/2004 |
| CN | 1610291 A * | 4/2005 |
| CN | 1845213 | 10/2006 |
| CN | 1905437 | 1/2007 |
| CN | 1905441 | 1/2007 |
| CN | 1983925 | 6/2007 |
| KR | 20020078190 A | 10/2002 |

OTHER PUBLICATIONS

The SMS4 Cryptography Algorithm for Wireless Network, Jan. 2006.*
"The SMS4 Cryptography Algorithm in Wireless LAN Product", Feb. 10, 2006.
International Search Report PCT/CN2007/070323; Dated Nov. 8, 2007.
European Search Report EP 07 76 4250 Dated Jun. 29, 2009.
Yier Jin,et al., "Implementation of SMS4 Block Cipher on FPGA", Communications and Networking in China, 2006 Chinacom 06. First International Conference on, IEEE PI, Oct. 1, 2006, pp. 1-4, XP031074758.
Xianwei Gao, et al., "FPGA Implementation of the SMS4 Block Cipher in the Chinese WAPI Standard", The 2008 International Conference on Embedded Software and Systems Symposia , Jul. 29, 2008, pp. 104-106 XP031322216.

* cited by examiner

*Primary Examiner* — Saleh Najjar
*Assistant Examiner* — Shu Chun Gao
(74) *Attorney, Agent, or Firm* — Cantor Colburn LLP (57) ABSTRACT

An encrypting/decrypting processing method for implementing SMS4 algorithm in high efficiency is provided. After preparing constant array, input external data into register section, firstly make primary data conversion and then make secondary data conversion, finally repeat data conversion course until complete all specified data conversion courses and obtain processing result of circulating data encryption/decryption. And it solves the technical problems of data conversion in the background technique that number of circulating times is large and encrypting efficiency is low, simplifying the chip design, largely optimizing integrity of chip signal and being able to improve interference immunity of system and reduce system cost.

12 Claims, 5 Drawing Sheets

HIGH-EFFICIENT ENCRYPTION AND DECRYPTION PROCESSING METHOD FOR IMPLEMENTING SMS4 ALGORITHM

The present invention claims priority to Chinese patent application No. 200610104431.8, entitled "ENCRYPTION AND DECRYPTION PROCESSING METHOD FOR IMPLEMENTING SMS4 ALGORITHM IN A HIGH-EFFICIENCY", filed with the Chinese Patent Office on Jul. 31, 2006, which is hereby incorporated by reference in its entirety.

FIELD OF THE INVENTION

The present invention relates to the field of information technology, particularly to an encryption and decryption processing method for implementing SMS4 algorithm in high-efficiency.

BACKGROUND OF THE INVENTION

Key components for implementing SMS4 cryptographic algorithm include a key extension section and an encryption and decryption section. The key extension section and the encryption and decryption section have substantially the same internal structure and processing procedure. The encryption and decryption component mainly includes three parts: a data consignation component, a constant array storage component, and a data conversion component.

The data consignation component mainly includes a generic trigger for consigning data. The data consigned in the data consignation component is constant in a clock cycle. The generic trigger is a data temporary memory which transmits data from its data input to the output of the trigger at a rising or falling edge of a clock and outputs constant data at the output of the trigger at other time.

The constant array storage component is a storage component for storing a constant array. The constant array in the prior art is generally a data array with a width of 32 bits and a depth of 32, which is prepared prior to encryption and decryption processing. Data in the constant array storage component is arranged according to the order of address, e.g. named rk0, rk1, ..., rk31.

The data conversion component is a component for processing data according to requirements of a cryptographic algorithm, e.g. processing data according to requirements of the national SMS4 cryptographic algorithm. Operations accomplished by the data conversion component include only one synthesis permutation specified by the cryptographic algorithm.

Figure 1:
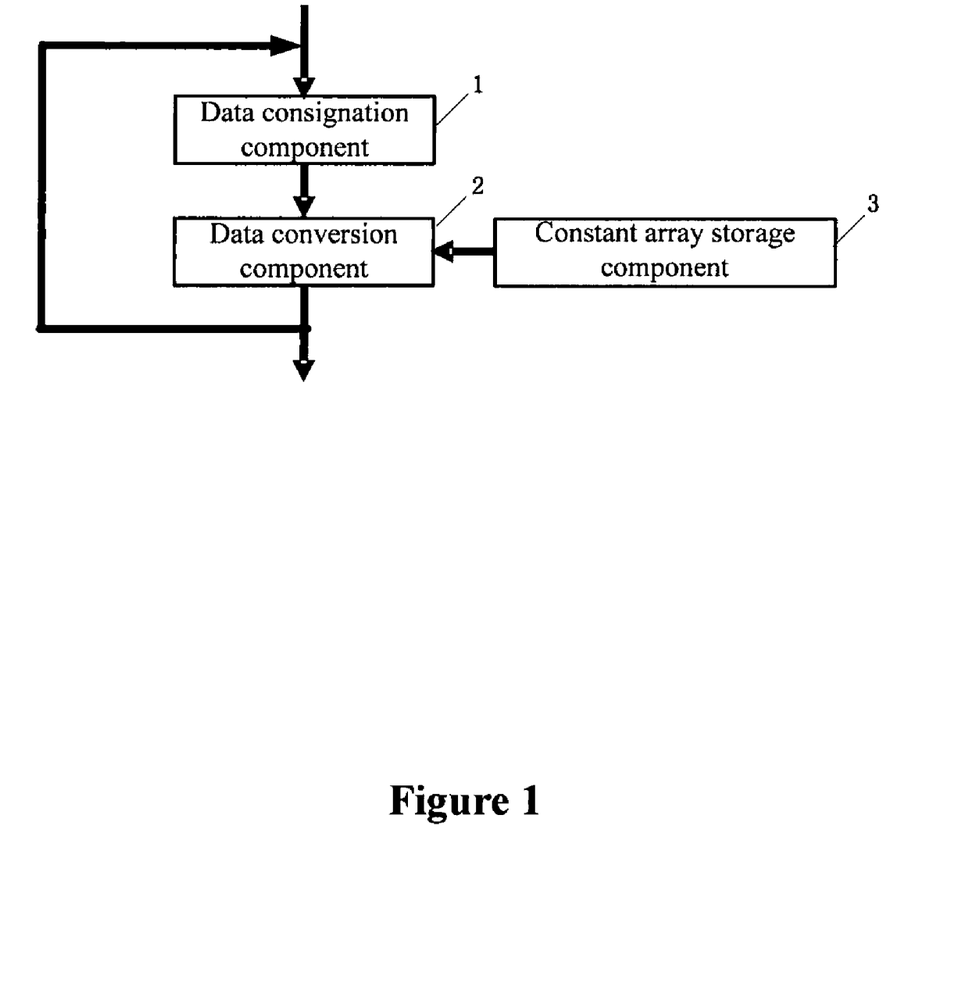
FIG. 1 is a block diagram of the prior art.

Referring to FIG. 1, a method for encryption and decryption data processing according to the requirements of the SMS4 cryptographic algorithm is described as follows.

1) External Data is Input to the Data Consignation Component 1.

After the external data is input to the data consignation component 1, the data consignation component 1 outputs data from its output. For example, 128-bit external data is divided into 4 32-bit data blocks named A0, A1, A2 and A3 respectively. The data output from the data consignation component is still 128-bit and is 4 32-bit data blocks named a0, a1, a2 and a3 respectively.

2) Data Conversion Processing is Performed.

The data from the output of the data consignation component 1 is input to the data conversion component 2, and data in the first row of constant arrays stored in the constant array storage component 3 is input to the data conversion component 2, for performing data conversion processing. The data a0, a1, a2, a3 from the output of the data consignation component 1 is converted into 128-bit data C0, C1, C2 and C3 via the data conversion component.

3) A Second Data Conversion Processing is Repeated.

The data after the previous data conversion processing is stored in the data consignation component 1 again, then data from the output of the data consignation component 1 is input to the data conversion component 2 again, and data in the next row of the constant arrays stored in the constant array storage component 3 is input to the data conversion component 2, for performing the second data conversion processing.

4) The Second Data Conversion Processing is Repeated to Obtain an Ultimate Data Processing Result.

The data conversion processing is performed on the 128-bit external data for another 30 times. In other words, only if the data conversion processing is performed for 32 times in all, can the ultimate data processing result be obtained.

In the above prior art, the constant array with a width of 32 bits and a depth of 32 is prepared prior to the encryption and decryption processing and the data conversion component performs only one synthesis permutation specified by the cryptographic algorithm, so that the cycle index of the data conversion processing is large. For example, for encrypting 128-bit data, the data conversion processing needs to be performed for at least 32 cycles to obtain the ultimate data processing result.

In addition, the above prior art results in low encryption and decryption efficiency. The encryption and decryption efficiency refers to data volume that is encrypted or decrypted in a unit time. For example, data conversion processing needs to be performed for 32 times for encrypting 128-bit data. At present, the clock frequency in practical application is generally low, so that data volume encrypted in a unit time is small and the efficiency is low. If encryption and decryption efficiency is designated, the clock frequency has to be increased. However, the clock frequency in practical application is difficult to increase, and the practical encryption and decryption efficiency therefore is still low. Also, the increment of the clock frequency will result in difficulty of design and implementation of existing integrated circuits, bad signal integrity, and high design cost. In addition, integrated circuits according to the prior art, if it is applied to a system, may: result in increased cost of printed circuit board, design difficulty of printed circuit board and difficulty of product implementation, and strong interference in the system which may influence normal and high-efficient operations of other devices and apparatus.

SUMMARY OF THE INVENTION

The present invention provides an encryption and decryption processing method for implementing SMS4 algorithm in high-efficiency, which can reduce the cycle index of data conversion processing and increase the efficiency of encryption and decryption.

The technical solution of the present invention is:

An encryption and decryption processing method for implementing SMS4 algorithm in high-efficiency, including:

1) preparing a constant array:

configuring a width and depth of the constant array data according to the number of data conversion processing components, data with the same width forming a row;

2) inputting external data to a first data consignation component:

at a triggering clock rising or falling edge of a first clock, transmitting data from the input of the first data consignation component to the output of the first data consignation component;

3) performing a first data conversion processing:

at a triggering clock rising or falling edge of the first clock, transmitting data at a first row of the constant array stored in a constant array storage component 3 to all data conversion components respectively;

in the same triggering clock cycle of the first clock, inputting the data from the output of the first data consignation component to a first data conversion component for data conversion processing; before a subsequent triggering clock rising or falling edge of a second clock arrives, transmitting by the first data conversion component a conversion processing result to the input of a second data consignation component;

at a triggering clock rising or falling edge of the second clock, transmitting the data from the input of the second data consignation component to the output of the second data consignation component;

in the same triggering clock cycle of the second clock, inputting the data from the output of the second data consignation component to a second data conversion component for data conversion processing; before a subsequent triggering clock rising or falling edge of the first clock arrives, transmitting a processing result to the input of a third data consignation component;

repeating the first data conversion processing until transmitting by a last data conversion component a processing result to the input of the first data consignation component;

4) performing a second data conversion processing:

at a next triggering clock rising or falling edge of the first clock, transmitting data at a next row of the constant array stored in the constant array storage component 3 to all the data conversion components respectively;

in the same triggering clock cycle of the first clock, inputting the data from the output of the first data consignation component to the first data conversion component for data conversion processing; before a subsequent triggering clock rising or falling edge of the second clock arrives, transmitting by the first data conversion component a conversion processing result to the input of the second data consignation component;

at a triggering clock rising or falling edge of the second clock, transmitting the data from the input of the second data consignation component to the output of the second data consignation component;

in the same triggering clock cycle of the second clock, inputting the data from the output of the second data consignation component to the second data conversion component for data conversion processing; before a further triggering clock rising or falling edge of the first clock arrives, transmitting a processing result to the input of the first data consignation component;

5) repeating the second data conversion processing:

repeating the second data conversion processing until all specified data conversion processing is completed so as to obtain a cyclic encryption and decryption data processing result.

Preferably, the step 2) further includes inputting external data to a A data consignation component 101:

at a triggering clock rising or falling edge of a clock A, transmitting data from the input of the A data consignation component 101 to the output of the A data consignation component 101;

the step 3) of performing a first data conversion processing further comprises:

(3.1) at a triggering clock rising or falling edge of the clock A, transmitting data at a first row of the constant array stored in a constant array storage component 3 to all data conversion components respectively;

(3.2) in the same triggering clock cycle of the clock A, inputting the data from the output of the A data consignation component 101 to a A data conversion component 102 for data conversion processing; before a subsequent triggering clock rising or falling edge of a clock D arrives, transmitting by the A data conversion component 102 a conversion processing result to the input of a D data consignation component 401;

(3.3) at a triggering clock rising or falling edge of the clock D, transmitting the data from the input of the D data consignation component 401 to the output of the D data consignation component 401;

(3.4) in the same triggering clock cycle of the second clock, inputting the data from the output of the D data consignation component 401 to a D data conversion component 402 for data conversion processing; before a subsequent triggering clock rising or falling edge of the clock A arrives, transmitting a processing result to the input of the A data consignation component 101;

the step 4) of performing a second data conversion processing further comprises:

(4.1) at a next triggering clock rising or falling edge of the clock A, transmitting data at a next row of the constant array stored in the constant array storage component 3 to all the data conversion components respectively;

(4.2) in the same triggering clock cycle of the clock A, inputting the data from the output of the A data consignation component 101 to the A data conversion component 102 for data conversion processing; before a subsequent triggering clock rising or falling edge of the clock D arrives, transmitting by the A data conversion component 102 a conversion processing result to the input of the D data consignation component 401;

(4.3) at a triggering clock rising or falling edge of the clock D, transmitting the data from the input of the D data consignation component 401 to the output of the D data consignation component 401;

(4.4) in the same triggering clock cycle of the clock D, inputting the data from the output of the D data consignation component 401 to the D data conversion component 402 for data conversion processing; before a further triggering clock rising or falling edge of the clock A arrives, transmitting a processing result to the input of the A data consignation component 101.

The preparation of the constant array meets the following requirements:

1) constant array data obtained from key extension processing is arranged according to the order of address and stored in the constant array storage component 3;

2) a width and depth is configured according to the number of data conversion processing components in the data conversion processing, with the width multiplied by the depth being 1024;

3) Data with the same width in the constant array forms a row;

a first row of the constant array stored in the constant array storage component 3 refers to a first address of the constant array storage component 3 in the process of encryption; the first row of the constant array stored in the constant array storage component 3 refers to a last address of the constant array storage component 3 in the process of decryption.

The frequency of clock A is the same as that of clock D, and there is a fixed phase difference between the clock A and the clock D.

The phase difference between the clock A and the clock D is equal, which is easy to implement.

The phase difference between the clock A and the clock D is preferably 180 degree, which is easiest to implement.

Preferably, the step 2) further includes inputting external data to a A data consignation component 101:

at a triggering clock rising or falling edge of a clock A, transmitting data from the input of the A data consignation component 101 to the output of the A data consignation component 101;

the step 3) of performing a first data conversion processing further comprises:

(3.1) at a triggering clock rising or falling edge of the clock A, transmitting data at a first row of the constant array stored in the constant array storage component 3 to all data conversion components respectively;

(3.2) in the same triggering clock cycle of the clock A, inputting the data from the output of the A data consignation component 101 to the A data conversion component 102 for data conversion processing; before a subsequent triggering clock rising or falling edge of a clock B arrives, transmitting by the A data conversion component 102 the conversion processing result to the input of a B data consignation component 201;

(3.3) at a triggering clock rising or falling edge of the clock B, transmitting the data from the input of the B data consignation component 201 to the output of the B data consignation component 201 respectively, (3.4) in the same triggering clock cycle of the clock B, inputting the data from the output of the B data consignation component 201 to a B data conversion component 202 for data conversion processing; before a subsequent triggering clock rising or falling edge of a clock C arrives, transmitting by the B data conversion component 202 a conversion processing result to the input of a C data consignation component 301;

(3.5) at a triggering clock rising or falling edge of the clock C, transmitting the data from the input of the C data consignation component 301 to the output of the C data consignation component 301 respectively;

(3.6) in the same triggering clock cycle of the clock C, inputting the data from the output of the C data consignation component 301 to a C data conversion component 302 for data conversion processing; before a subsequent triggering clock rising or falling edge of a clock D arrives, transmitting the conversion processing result to the input of a D data consignation component 401;

(3.7) at a triggering clock rising or falling edge of the clock D, transmitting the data from the input of the D data consignation component 401 to the output of the D data consignation component 401 respectively;

(3.8) in the same triggering clock cycle of the clock D, inputting the data from the output of the D data consignation component 401 to a D data conversion component 402 for data conversion processing; before a subsequent triggering clock rising or falling edge of the clock A arrives, transmitting a processing result to the input of the A data consignation component 101;

the step 4) of performing a second data conversion processing further comprises:

(4.1) at a next triggering clock rising or falling edge of the clock A, transmitting the data at a next row of the constant array stored in the constant array storage component 3 to all data conversion components respectively;

(4.2) in the same triggering clock cycle of the clock A, inputting the data from the output of the A data consignation component 101 to the A data conversion component 102 for data conversion processing; before a subsequent triggering clock rising or falling edge of the clock B arrives, transmitting by the A data conversion component 102 a conversion processing result to the input of B data consignation component 401;

(4.3) at a triggering clock rising or falling edge of the clock B, transmitting the data from the input of the B data consignation component 201 to the output of the B data consignation component 201;

(4.4) in the same triggering clock cycle of the clock B, inputting the data from the output of the B data consignation component 201 to the B data conversion component 202 for data conversion processing; before a subsequent triggering clock rising or falling edge of the clock C arrives, transmitting a processing result to the input of the C data consignation component 301;

(4.5) at a triggering clock rising or falling edge of the clock C, transmitting the data from the input of the C data consignation component 301 to the output of the C data consignation component 301;

(4.6) in the same triggering clock cycle of the clock C, inputting the data from the output of the C data consignation component 301 to the C data conversion component 302 for data conversion processing; before a subsequent triggering clock rising or falling edge of the clock D arrives, transmitting a processing result to the input of the D data consignation component 401;

(4.7) at a triggering clock rising or falling edge of the clock D, transmitting the data from the input of the D data consignation component 401 to the output of the D data consignation component 401;

(4.8) in the same triggering clock cycle of the clock D, inputting the data from the output of the D data consignation component 401 to the D data conversion component 402 for data conversion processing; before a further triggering clock rising or falling edge of the clock A arrives, transmitting a processing result to the input of the A data consignation component 101.

The preparation of the constant array meets the following requirements:

1) constant array data obtained from key extension processing is arranged according to the order of address and stored in the constant array storage component (3);

2) a width and depth is configured according to the number of data conversion processing components in the data conversion processing, with the width multiplied by the depth being 1024;

3) Data with the same width in the constant array forms a row;

a first row of the constant array stored in the constant array storage component (3) refers to a first address of the constant array storage component (3) in the process of encryption; the first row of the constant array stored in the constant array storage component (3) refers to a last address of the constant array storage component (3) in the process of decryption.

The clock A, the clock B, the clock C and the clock D have the same frequency, and there is fixed phase differences between the clock A and the clock B, between the clock B and the clock C as well as between the clock C and the clock D.

The phase differences between the clock A and the clock B, between the clock B and the clock C as well as between the clock C and the clock D are preferably equal to each other, which is easy to implement.

The phase differences between the clock A and the clock B, between the clock B and the clock C as well as between the clock C and the clock D are preferably 90 degree, which is easiest to implement.

An encryption and decryption processing device for implementing SMS4 algorithm in high-efficiency according to the present invention can reduce the cycle index of data conversion processing. For example, if 128-bit data is to be encrypted, in the case that the actual clock frequency is not high, ultimate data can be obtained by processing of 16 cycles if two data conversion components are adopted; and ultimate data processing result can be obtained by processing of only 8 cycles if four data conversion components are adopted. In other words, data encrypted in a unit time is increased greatly. In addition, because the volume of data encrypted in a unit time is increased greatly, the efficiency of encryption and decryption is increased greatly. If the efficiency of encryption is designated, the required efficiency of encryption can be attained in the case that the frequency is not high.

Accordingly, with the integrated circuit according to the present invention, in the case that the required efficiency of encryption and decryption is met, only half of the conventional clock frequency is required because the clock frequency according to the present invention is merely half of the conventional clock frequency. In the case of the same processing efficiency, the chip for implementing the method has the following features: greatly optimizing the integrity of signals in the chip, simplifying the design of the chip so that the chip is easy to be implemented, and during the design cost of the chip is reduced.

In addition, with the integrated circuit according to the present invention, in the case that the required efficiency of encryption and decryption is met, only half of the conventional clock frequency is required because the clock frequency according to the present invention is merely half of the conventional clock frequency. In the case of the same processing efficiency, the present invention has also the following features: reducing the cost of Printed Circuit Board (PCB), simplifying the design of PCB so that the printed circuit board is easy to be implemented, and reducing interference in the system thereby greatly reducing the influence on other devices and apparatus.

Reference signs: 1—data consignation component, 2—data conversion component, 3—constant array storage component, 101—data consignation component A, 102—data conversion component A, 201—data consignation component B, 202—data conversion component B, 301—data consignation component C, 302—data conversion component C, 401—data consignation component D, 402—data conversion component D.

DETAILED DESCRIPTION OF THE INVENTION

The technical solutions of embodiments of the present invention are described clearly and completely with reference to the attached drawings in the embodiments. Apparently, the described embodiments are merely part of embodiments of the present invention but not all embodiments. All other embodiments worked out by an ordinary skilled in the art without creative labor based on the embodiments of the present invention shall fall into the protection scope of the present invention.

The present invention is implemented mainly via a data consignation component group, a data conversion component group and a constant array storage component.

The data consignation component group includes multiple data consignation components adapted to consign external data and a previous data conversion processing result. Generally, the data consignation component may be a generic trigger such as a D trigger and a JK trigger. The generic trigger is a data temporary memory which transmits data from its data input to the output of the trigger at a rising or falling edge of a clock and outputs constant data at the output of the trigger at other time. The data consigned in the data consignation component is constant in the same data conversion processing cycle.

The data conversion component group includes multiple data conversion components. The data conversion component is a component for processing data according to requirements of a cryptographic algorithm, e.g. processing data according to requirements of the national SMS4 cryptographic algorithm. Operations accomplished by the data conversion component include at least one synthesis permutation specified by the cryptographic algorithm. The following description of the present invention takes operations accomplished by the data conversion component including one synthesis permutation specified by the cryptographic algorithm as an example. For the cases that operations accomplished by the data conversion component include two or more synthesis permutations specified by the cryptographic algorithm, it is easy for those skilled in the art to implement according to the technical solutions of the embodiments of the present invention and thus is not described here.

The constant array storage component is adapted to store constant array data. In the present invention, the constant array is resultant data obtained from key extension processing, which is arranged according to the order of address, and the width and depth of the constant array are arranged according to the number of data conversion components in a loop, with the width multiplied by the depth being 1024, e.g. a constant array with a width of 32 bits and a depth of 32. The data in the constant array storage component is arranged according to the order of address and named rk0, rk1, . . . rk31.

Figure 2:
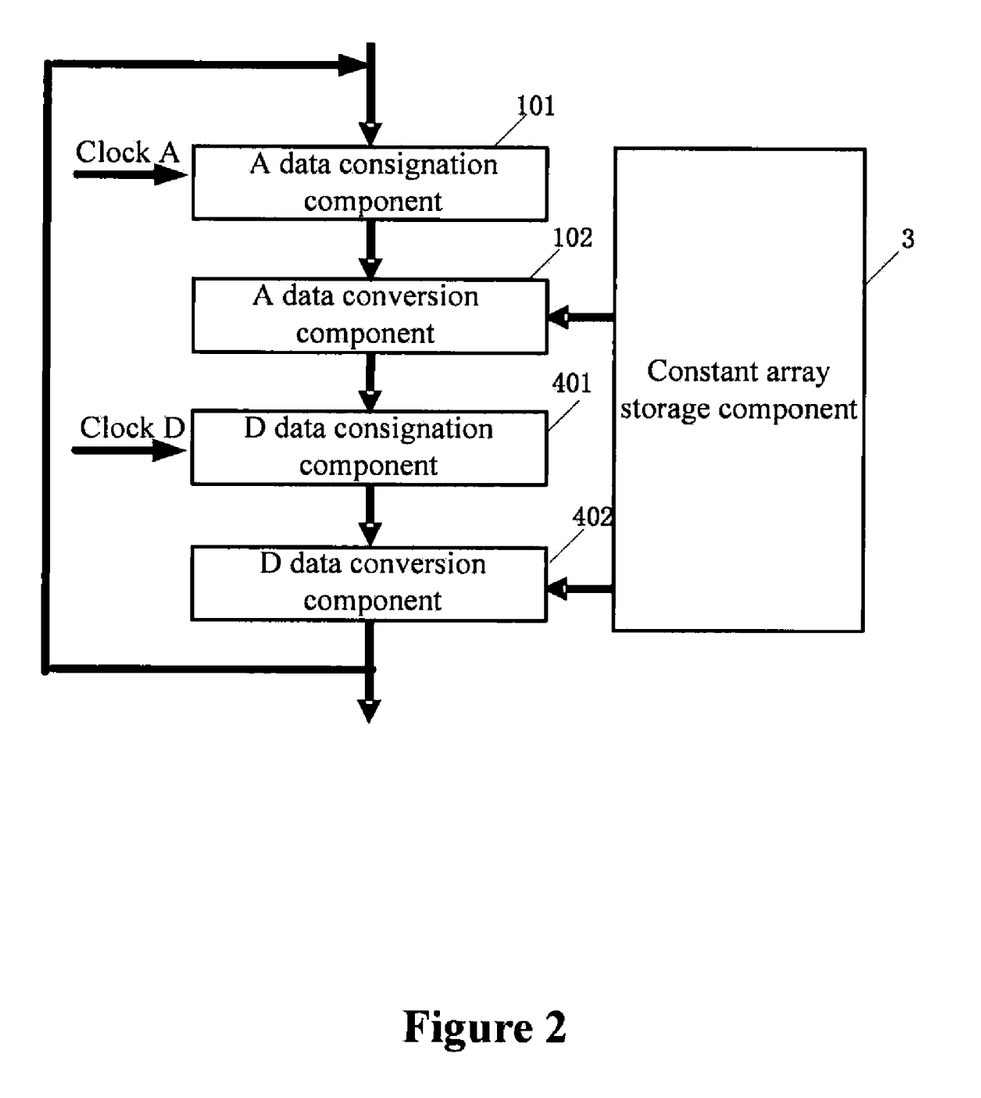
FIG. 2 is a block diagram of a first embodiment of the present invention.
Figure 3:
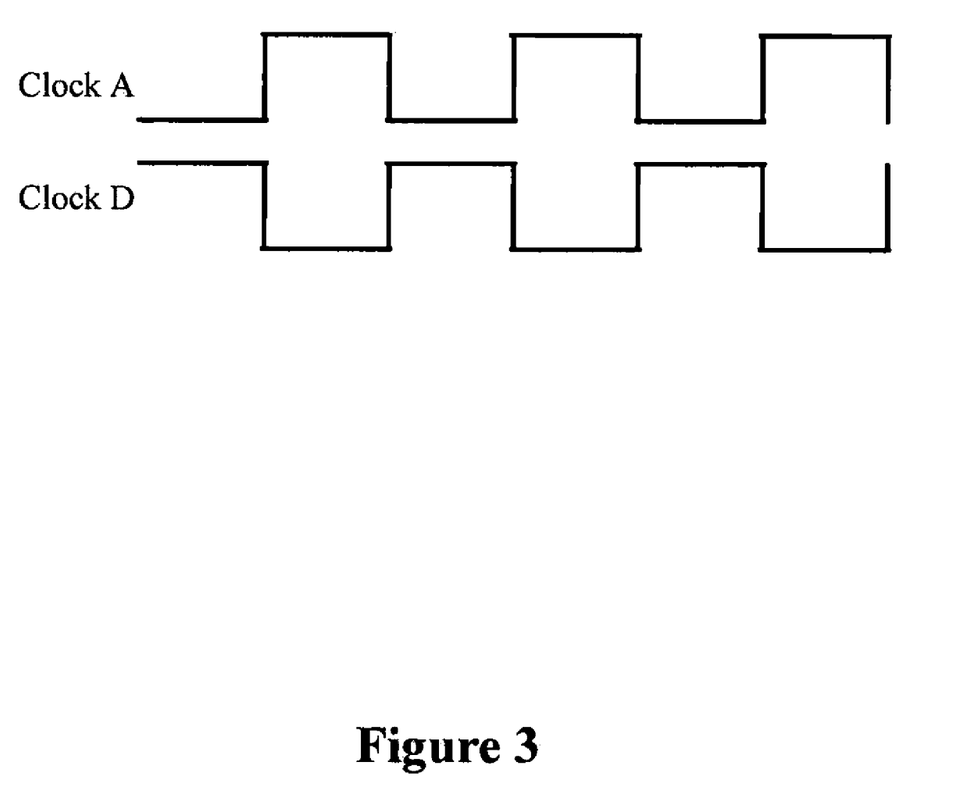
FIG. 3 is a clock diagram according to the first embodiment of the present invention.

Referring to FIG. 2 and FIG. 3, the first embodiment includes the steps as follows.

1) Prepare a Constant Array (1) Constant array data obtained from key extension processing is arranged according to the order of address and stored in the constant array storage component 3.

(2) A corresponding width and depth is configured according to the number of data conversion processing components in the data conversion processing, with the width multiplied by the depth being 1024. Two data conversion processing components are adopted, and in this case the width of the constant array is 64 bits and the depth is 16.

(3) Data with the same width in the constant array forms a row. The 1024-bit constant array data with the depth of 16 is divided into 16 rows, which are named rk0, rk1, . . . rk15 respectively.

In the process of encryption, the first row of the constant array stored in the constant array storage component 3 refers to the first address of the constant array storage component 3, and data corresponding to this address is rk0; the data in the constant array storage component 3, rk0, rk1, . . . rk15, is extracted in the whole data conversion processing.

In the process of decryption, the first row of the constant array stored in the constant array storage component 3 refers to the last address of the constant array storage component 3, and data corresponding to this address is rk15; the data in the constant array storage component 3, rk15, rk14, . . . rk0, is extracted in the whole data conversion processing.

2) Input External Data to A Data Consignation Component 101

At a triggering clock rising or falling edge of clock A, data from the input of the A data consignation component 101 is transmitted to the output of the A data consignation component 101.

3) Perform a First Data Conversion Processing (1) At a triggering clock rising or falling edge of clock A, the data at the first row of the constant array stored in the constant array storage component 3 is transmitted to all data conversion components respectively.

(2) In the same triggering clock cycle of clock A, the data from the output of the A data consignation component 101 is input to A data conversion component 102 for data conversion processing; before an immediately subsequent triggering clock rising or falling edge of clock D arrives, the A data conversion component 102 transmits the conversion processing result to the input of D data consignation component 401.

(3) At a triggering clock rising or falling edge of clock D, the data from the input of the D data consignation component 401 is transmitted to the output of the D data consignation component 401.

(4) In the same triggering clock cycle of clock D, the data from the output of the D data consignation component 401 is input to D data conversion component 402 for data conversion processing; before an immediately subsequent triggering clock rising or falling edge of clock A arrives, the processing result is transmitted to the input of the A data consignation component 101.

4) Perform a Second Data Conversion Processing (1) At the next triggering clock rising or falling edge of clock A, the data at the next row of the constant array stored in the constant array storage component 3 is transmitted to all data conversion components respectively.

(2) In the same triggering clock cycle of clock A, the data from the output of the A data consignation component 101 is input to the A data conversion component 102 for data conversion processing; before an immediately subsequent triggering clock rising or falling edge of clock D arrives, the A data conversion component 102 transmits the conversion processing result to the input of the D data consignation component 401.

(3) At a triggering clock rising or falling edge of clock D, the data from the input of the D data consignation component 401 is transmitted to the output of the D data consignation component 401.

(4) In the same triggering clock cycle of clock D, the data from the output of the D data consignation component 401 is input to the D data conversion component 402 for data conversion processing; before a further subsequent triggering clock rising or falling edge of clock A arrives, the processing result is transmitted to the input of the A data consignation component 101.

5) Repeat the Second Data Conversion Processing

The second data conversion processing is repeated until all specified data conversion processing is completed so as to obtain a cyclic encryption and decryption data processing result. In the case of the two data conversion components, the second data conversion processing is repeated for 15 times.

Figure 4:
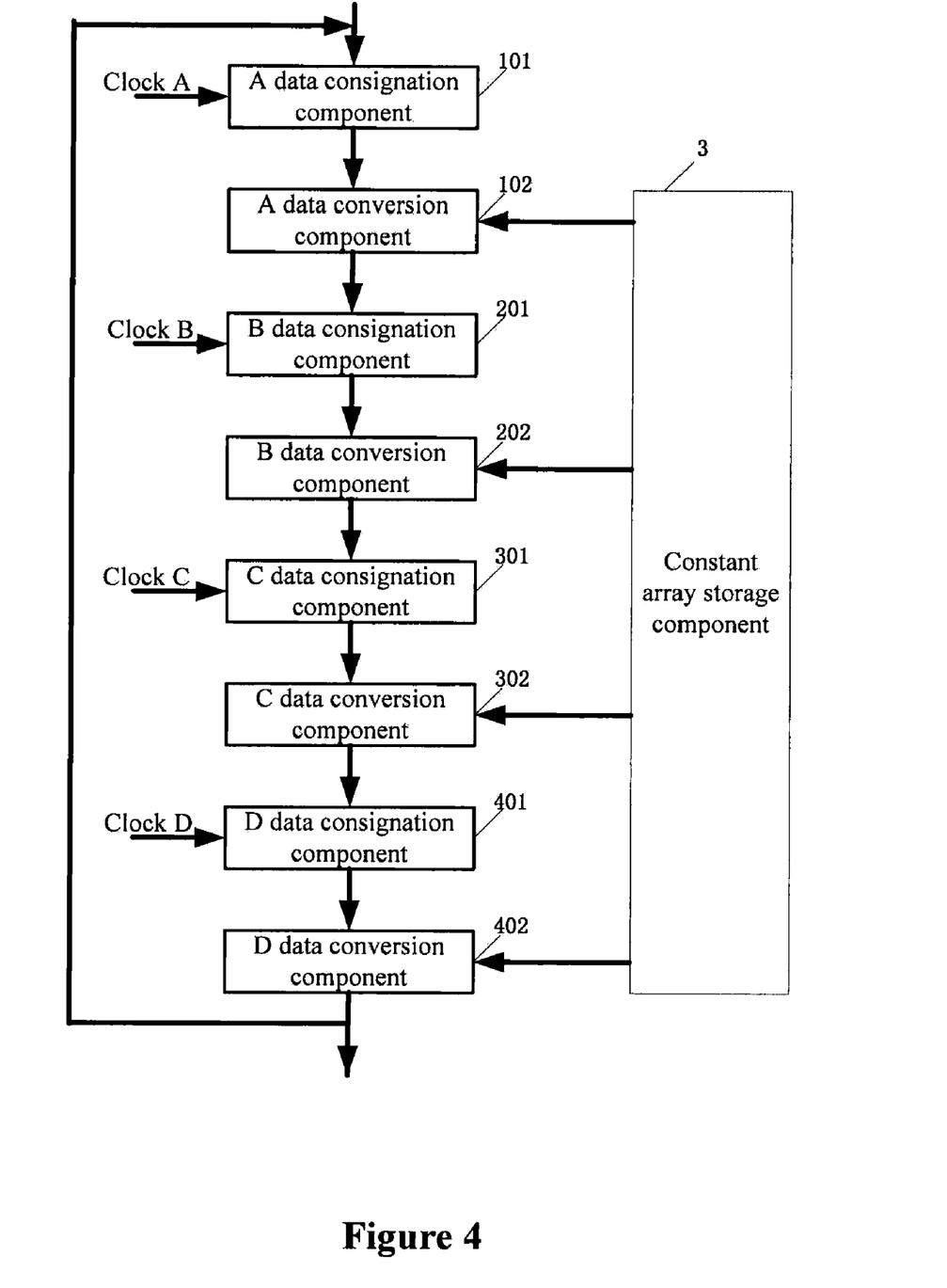
FIG. 4 is a block diagram of a second embodiment of the present invention.
Figure 5:
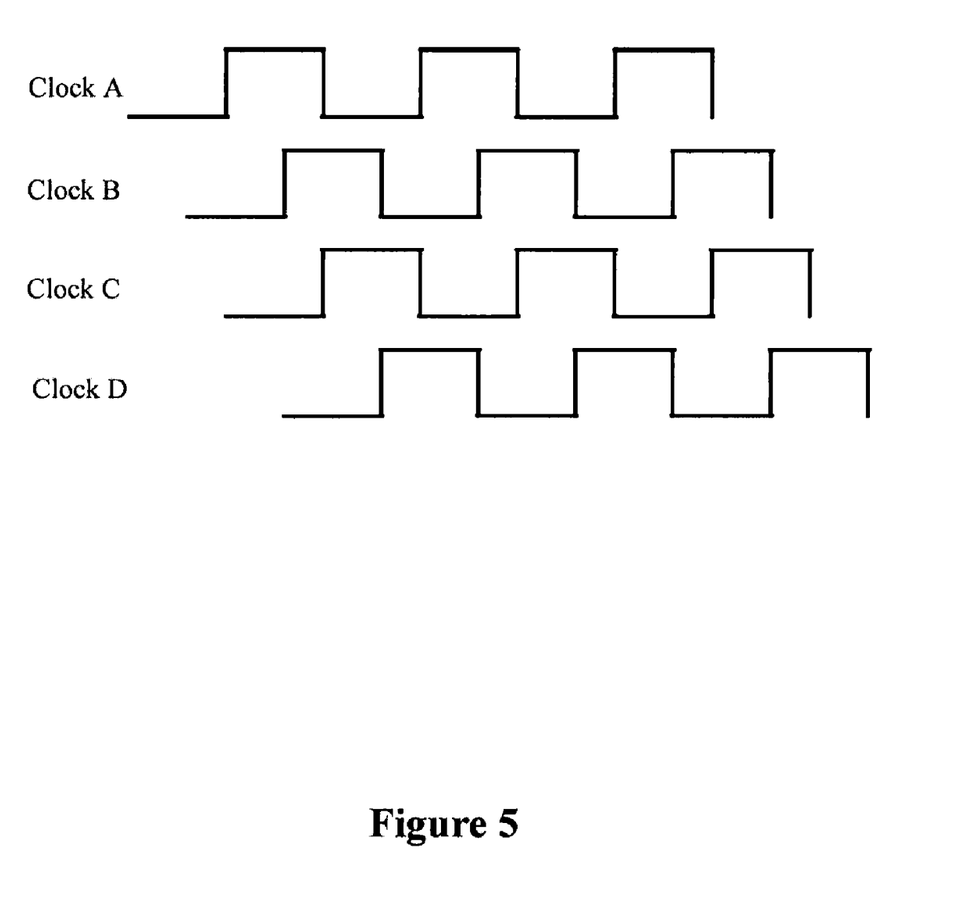
FIG. 5 is a clock diagram according to the second embodiment of the present invention.

Referring to FIGS. 4 and 5, a second embodiment includes the steps as follows.

1) Prepare a Constant Array (1) Constant array data obtained from key extension processing is arranged according to the order of address and stored in the constant array storage component 3.

(2) A corresponding width and depth is configured according to the number of data conversion processing components in the data conversion processing, with the width multiplied by the depth being 1024. Four data conversion processing components are adopted, and in this case the width of the constant array is 128 bits and the depth is 16.

(3) Data with the same width in the constant array forms a row. The 1024-bit constant array data with the depth of 8 is divided into 8 rows, which are named rk0, rk1, . . . rk7 respectively; each 128-bit row of the constant array is divided into four 32-bit data blocks, i.e., rk0 is divided into rk0$a$, rk0$b$, rk0$c$, rk0$d$; rk1 is divided into rk1$a$, rk1$b$, rk1$c$, rk1$d$.

2) Input External Data in Plaintext to A Data Consignation Component 101

(1) External data is input in plaintext to the A data consignation component 101. 128-bit external data is divided into four 32-bit data blocks, which are named A0, A1, A2, A3 respectively.

(2) Under the control of clock A, i.e., at a triggering clock rising or falling edge of clock A, the data from the input of the A data consignation component 101 is transmitted to the output of the A data consignation component 101. The A data consignation component 101 outputs 128-bit data divided into four 32-bit data blocks named a0, a1, a2, a3.

3) Perform a First Data Conversion Processing (1) At a triggering clock rising or falling edge of clock A, the data at the first row of the constant array stored in the constant array storage component 3 is transmitted to all data conversion components respectively, i.e., A data conversion component 102, B data conversion component 202, C data conversion component 302, D data conversion component 402.

(2) In the same triggering clock cycle of clock A, the data from the output of the A data consignation component 101, a0, a1, a2, a3, and the data output from the constant array storage component 3, rk0$a$, are transmitted to the A data conversion component 102 for data conversion processing. The data after conversion processing is still 128-bit and named B0, B1, B2, B3 respectively. Before an immediately subsequent triggering clock rising or falling edge of clock B arrives, the A data conversion component 102 transmits the conversion processing result to the input of B data consignation component 201.

(3) At a triggering clock rising or falling edge of clock B, the data from the input of the B data consignation component 201 is transmitted to the output of the B data consignation component 201 and named b0, b1, b2, b3 respectively.

(4) In the same triggering clock cycle of clock B, the data from the output of the B data consignation component 201, b0, b1, b2, b3, and the data output from the constant array storage component 3, rk0$b$, are input to B data conversion component 202 for data conversion processing. The data after conversion processing is still 128-bit and named C0, C1, C2, C3 respectively. Before an immediately subsequent triggering clock rising or falling edge of clock C arrives, the B data conversion component 202 transmits the conversion processing result to the input of C data consignation component 301.

(5) At a triggering clock rising or falling edge of clock C, the data from the input of the C data consignation component 301 is transmitted to the output of the C data consignation component 301 and named c0, c1, c2, c3 respectively.

(6) In the same triggering clock cycle of clock C, the data from the output of the C data consignation component 301, c0, c1, c2, c3, and the data output from the constant array storage component 3, rk0c, are input to C data conversion component 302 for data conversion processing. The data after conversion processing is still 128-bit and named D0, D1, D2, D3 respectively. Before an immediately subsequent triggering clock rising or falling edge of clock D arrives, the C data conversion component 302 transmits the conversion processing result to the input of D data consignation component 401.

(7) At a triggering clock rising or falling edge of clock D, the data from the input of the D data consignation component 401 is transmitted to the output of the D data consignation component 401 and named d0, d1, d2, d3 respectively.

(8) In the same triggering clock cycle of clock D, the data from the output of the D data consignation component 401, d0, d1, d2, d3, and the data output from the constant array storage component 3, rk0d, are input to D data conversion component 402 for data conversion processing. The data after conversion processing is still 128-bit and named E0, E1, E2, E3 respectively. Before an immediately subsequent triggering clock rising or falling edge of clock A arrives, the D data conversion component 402 transmits the conversion processing result to the input of A data consignation component 101. E0, E1, E2, E3 is the resultant data of the first data conversion processing.

4) Perform a Second Data Conversion Processing (1) At the next triggering clock rising or falling edge of clock A, the data at the next row of the constant array stored in the constant array storage component 3, rk1a, rk1b, rk1c, rk1d, is transmitted to all data conversion components respectively.

(2) In the same triggering clock cycle of clock A, the data from the output of the A data consignation component 101, e0, e1, e2, e3, and the data output from the constant array storage component 3, rk1a, are input to the A data conversion component 102 for data conversion processing; before an immediately subsequent triggering clock rising or falling edge of clock D arrives, the A data conversion component 102 transmits the conversion processing result to the input of D data consignation component 401.

(3) At a triggering clock rising or falling edge of clock D, the data from the input of the D data consignation component 401 is transmitted to the output of the D data consignation component 401.

(4) In the same triggering clock cycle of clock D, the data from the output of the D data consignation component 401 is input to the D data conversion component 402 for data conversion processing; before a further triggering clock rising or falling edge of clock A arrives, the processing result is transmitted to the input of A data consignation component 101.

5) Repeat the Second Data Conversion Processing

The second data conversion processing is repeated until all specified data conversion processing is completed so as to a cyclic encryption and decryption data processing result. In the case of the four data conversion components, the second data conversion processing is repeated for 7 times.

In the embodiments of the present invention, the number of data consignation components included in the data consignation component group may be a value which is more than 1 and less than or equal to 32, and preferably 2, 4 or 8. The number of data conversion components included in the data conversion component group may be a value which is more than 1 and less than or equal to 32, and preferably 2, 4 or 8. However, the number of data consignation components included in the data consignation component group should be equal to the number of data conversion components included in the data conversion component group.

Clock frequencies according to the present invention are the same and the clocks have fixed phase differences. The phase differences are preferably equal to each other, which is the easiest to implement by equally dividing 360 degree with the number of clocks. The triggering of clock is controlled by either rising edges or falling edges.

An encryption and decryption processing device for implementing SMS4 algorithm in high-efficiency according to the present invention can reduce the cycle index of data conversion processing. For example, if 128-bit data is to be encrypted, in the case that the actual clock frequency is not high, ultimate data can be obtained by processing of 16 cycles if two data conversion components are adopted; and ultimate data processing result can be obtained by processing of only 8 cycles if four data conversion components are adopted. In other words, data encrypted in a unit time is increased greatly. In addition, because the volume of data encrypted in a unit time is increased greatly, the efficiency of encryption and decryption is increased greatly. If the efficiency of encryption is designated, the required efficiency of encryption can be attained in the case that the frequency is not high.

Accordingly, with the integrated circuit according to the present invention, in the case that the required efficiency of encryption and decryption is met, only half of the conventional clock frequency is required because the clock frequency according to the present invention is merely half of the conventional clock frequency. In the case of the same processing efficiency, the chip for implementing the method has the following features: greatly optimizing the integrity of signals in the chip, simplifying the design of the chip so that the chip is easy to be implemented, and during the design cost of the chip is reduced.

In addition, with the integrated circuit according to the present invention, in the case that the required efficiency of encryption and decryption is met, only half of the conventional clock frequency is required because the clock frequency according to the present invention is merely half of the conventional clock frequency. In the case of the same processing efficiency, the present invention has also the following features: reducing the cost of Printed Circuit Board (PCB), simplifying the design of PCB so that the printed circuit board is easy to be implemented, and reducing interference in the system thereby greatly reducing the influence on other devices and apparatus.

The above embodiments are for describing the principle of the present invention. It can be understood that detailed embodiments are not limited to these ones. Various variations and modifications made by those skilled in the art without departing from the scope of the present invention should be encompassed by the scope of the present invention. Therefore, the scope of the present invention is defined by the claims.

What is claimed is:

1. An encryption and decryption processing method for implementing SMS4 algorithm in high-efficiency, comprising:

1) preparing a constant array:
      configuring a width and depth of the constant array data according to a number of data conversion processing components, data with a same width forming a row;
   2) inputting external data to a first data consignation component: at a triggering clock rising or falling edge of a first clock, transmitting data from an input of the first data consignation component to an output of the first data consignation component;
3) performing a first data conversion processing:
at a triggering clock rising or falling edge of the first clock, transmitting data at a first row of the constant array stored in a constant array storage component (3) to all data conversion components respectively;
in a clock cycle triggered by the triggering clock rising or falling edge of the first clock, inputting the data from the output of the first data consignation component to a first data conversion component for data conversion processing; before a subsequent triggering clock rising or falling edge of a second clock arrives, transmitting by the first data conversion component a conversion processing result to an input of a second data consignation component;
at a triggering clock rising or falling edge of the second clock, transmitting the data from the input of the second data consignation component to an output of the second data consignation component;
in a clock cycle triggered by the triggering clock rising or falling edge of the second clock, inputting the data from the output of the second data consignation component to a second data conversion component for data conversion processing; before a subsequent triggering clock rising or falling edge of the first clock arrives, transmitting a processing result to an input of a third data consignation component;
repeating the first data conversion processing until transmitting by a last data conversion component a processing result to the input of the first data consignation component;
4) performing a second data conversion processing:
at a next triggering clock rising or falling edge of the first clock, transmitting data at a next row of the constant array stored in the Constant array storage component (3) to all the data conversion components respectively;
in the same triggering clock cycle of the first clock, inputting the data from the output of the first data consignation component to the first data conversion component for data conversion processing; before a subsequent triggering clock rising or falling edge of the second clock arrives, transmitting by the first data conversion component a conversion processing result to the input of the second data consignation component;
at a triggering clock rising or falling edge of the second clock, transmitting the data from the input of the second data consignation component to the output of the second data consignation component;
in the same triggering clock cycle of the second clock, inputting the data from the output of the second data consignation component to the second data conversion component for data conversion processing; before a further triggering clock rising or falling edge of the first clock arrives, transmitting a processing result to the input of the first data consignation component;
5) repeating the second data conversion processing:
repeating the second data conversion processing until all specified data conversion processing is completed so as to obtain a cyclic encryption and decryption data processing result.

2. The encryption and decryption processing method for implementing SMS4 algorithm in high-efficiency according to claim 1, wherein the step 2) further comprises inputting external data to a A data consignation component (101):
at a triggering clock rising or falling edge of a clock A, transmitting data from an input of the A data consignation component (101) to an output of the A data consignation component (101);
the step 3) of performing a first data conversion processing further comprises:
(3.1) at a triggering clock rising or falling edge of the clock A, transmitting data at a first row of the constant array stored in a constant array storage component (3) to all data conversion components respectively;
(3.2) in a clock cycle triggered by the triggering clock rising or falling edge of the clock A, inputting the data from an output of the A data consignation component (101) to a A data conversion component (102) for data conversion processing; before a subsequent triggering clock rising or falling edge of a clock D arrives, transmitting by the A data conversion component (102) a conversion processing result to an input of a D data consignation component (401);
(3.3) at a triggering clock rising or falling edge of the clock D, transmitting the conversion processing result from the input of the D data consignation component (401) to the output of the D data consignation component (401);
(3.4) in the same triggering clock cycle of the second clock, inputting the data from the output of the D data consignation component (401) to a D data conversion component (402) for data conversion processing; before a subsequent triggering clock rising or falling edge of the clock A arrives, transmitting a processing result to the input of the A data consignation component (101);
the step 4) of performing a second data conversion processing further comprises:
(4.1) at a next triggering clock rising or falling edge of the clock A, transmitting data at a next row of the constant array stored in the constant array storage component (3) to all the data conversion components respectively;
(4.2) in the same triggering clock cycle of the clock A, inputting the data from the output of the A data consignation component (101) to the A data conversion component (102) for data conversion processing; before a subsequent triggering clock rising or falling edge of the clock D arrives, transmitting by the A data conversion component (102) a conversion processing result to the input of the D data consignation component (401);
(4.3) at a triggering clock rising or falling edge of the clock D, transmitting the data from the input of the D data consignation component (401) to the output of the D data consignation component (401);
(4.4) in a clock cycle triggered by the triggering clock rising or falling edge of the clock D, inputting the data from the output of the D data consignation component (401) to the D data conversion component (402) for data conversion processing; before a further triggering clock rising or falling edge of the clock A arrives, transmitting a processing result to the input of the A data consignation component (101).

3. The encryption and decryption processing method for implementing SMS4 algorithm in high-efficiency according to claim 2, wherein the preparation of the constant array meets the following requirements:
1) constant array data obtained from key extension processing is arranged according to an order of address and stored in the constant array storage component (3);
2) a width and depth is configured according to the number of data conversion processing components in the data conversion processing, with the width multiplied by the depth being 1024;

3) Data with the same width in the constant array forms a row;
a first row of the constant array stored in the constant array storage component (3) refers to a first address of the constant array storage component (3) in a process of encryption; the first row of the constant array stored in the constant array storage component (3) refers to a last address of the constant array storage component (3) in a process of decryption.

4. The encryption and decryption processing method for implementing SMS4 algorithm in high-efficiency according to claim 3, wherein the frequency of clock A is the same as that of clock D, and there is a fixed phase difference between the clock A and the clock D.

5. The encryption and decryption processing method for implementing SMS4 algorithm in high-efficiency according to claim 2, wherein a phase difference between the clock A and the clock D is 180 degree.

6. The encryption and decryption processing method for implementing SMS4 algorithm in high-efficiency according to claim 1, wherein
the step 2) further comprises inputting external data to a A data consignation component (101):
at a triggering clock rising or falling edge of a clock A, transmitting data from an input of the A data consignation component (101) to the output of the A data consignation component (101);
the step 3) of performing a first data conversion processing further comprises:
(3.1) at a triggering clock rising or falling edge of the clock A, transmitting data at a first row of the constant array stored in the constant array storage component (3) to all data conversion components respectively;
(3.2) in a clock cycle triggered by the triggering clock rising or falling edge of the clock A, inputting the data from the output of the A data consignation component (101) to the A data conversion component (102) for data conversion processing; before a subsequent triggering clock rising or falling edge of a clock B arrives, transmitting by the A data conversion component (102) the conversion processing result to an input of a B data consignation component (201);
(3.3) at a triggering clock rising or falling edge of the clock B, transmitting the conversion processing result from the input of the B data consignation component (201) to an output of the B data consignation component (201) respectively;
(3.4) in a clock cycle triggered by the triggering clock rising or falling edge of the clock B, inputting the data from the output of the B data consignation component (201) to a B data conversion component (202) for data conversion processing; before a subsequent triggering clock rising or falling edge of a clock C arrives, transmitting by the B data conversion component (202) a conversion processing result to an input of a C data consignation component (301);
(3.5) at a triggering clock rising or falling edge of the clock C, transmitting the conversion processing result from the input of the C data consignation component (301) to an output of the C data consignation component (301) respectively;
(3.6) in a clock cycle triggered by the triggering clock rising or falling edge of the clock C, inputting the conversion processing result from the output of the C data consignation component (301) to a C data conversion component (302) for data conversion processing; before a subsequent triggering clock rising or falling edge of a clock D arrives, transmitting the conversion processing result to the input of a D data consignation component (401);
(3.7) at a triggering clock rising or falling edge of the clock D, transmitting the conversion processing result from the input of the D data consignation component (401) to an output of the D data consignation component (401) respectively;
(3.8) in a clock cycle triggered by the triggering clock rising or falling edge of the clock D, inputting the conversion processing result from the output of the D data consignation component (401) to a D data conversion component (402) for data conversion processing; before a subsequent triggering clock rising or falling edge of the clock A arrives, transmitting a processing result to the input of the A data consignation component (101);
the step 4) of performing a second data conversion processing further comprises:
(4.1) at a next triggering clock rising or falling edge of the clock A, transmitting the data at a next row of the constant array stored in the constant array storage component (3) to all data conversion components respectively;
(4.2) in the same triggering clock cycle of the clock A, inputting the data from the output of the A data consignation component (101) to the A data conversion component (102) for data conversion processing; before a subsequent triggering clock rising or falling edge of the clock B arrives, transmitting by the A data conversion component (102) a conversion processing result to the input of B data consignation component (401);
(4.3) at a triggering clock rising or falling edge of the clock B, transmitting the data from the input of the B data consignation component (201) to the output of the B data consignation component (201);
(4.4) in the triggering clock cycle of the clock B, inputting the data from the output of the B data consignation component (201) to the B data conversion component (202) for data conversion processing; before a subsequent triggering clock rising or falling edge of the clock C arrives, transmitting a processing result to the input of the C data consignation component (301);
(4.5) at a triggering clock rising or falling edge of the clock C, transmitting the data from the input of the C data consignation component (301) to the output of the C data consignation component (301);
(4.6) in the same triggering clock cycle of the clock C, inputting the data from the output of the C data consignation component (301) to the C data conversion component (302) for data conversion processing; before a subsequent triggering clock rising or falling edge of the clock D arrives, transmitting a processing result to the input of the D data consignation component (401);
(4.7) at a triggering clock rising or falling edge of the clock D, transmitting the data from the input of the D data consignation component (401) to the output of the D data consignation component (401);
(4.8) in the same triggering clock cycle of the clock D, inputting the data from the output of the D data consignation component (401) to the D data conversion component (402) for data conversion processing; before a further triggering clock rising or falling edge of the clock A arrives, transmitting a processing result to the input of the A data consignation component (101).

7. The encryption and decryption processing method for implementing SMS4 algorithm in high-efficiency according to claim 6, wherein the preparation of the constant array meets the following requirements:

1) constant array data obtained from key extension processing is arranged according to an order of address and stored in the constant array storage component (3);
2) a width and depth is configured according to the number of data conversion processing components in the data conversion processing, with the width multiplied by the depth being 1024;
3) Data with the same width in the constant array forms a row;

a first row of the constant array stored in the constant array storage component (3) refers to a first address of the constant array storage component (3) in a process of encryption; the first row of the constant array stored in the constant array storage component (3) refers to a last address of the constant array storage component (3) in a process of decryption.

8. The encryption and decryption processing method for implementing SMS4 algorithm in high-efficiency according to claim 6, wherein the clock A, the clock B, the clock C and the clock D have a same frequency, and there is fixed phase differences between the clock A and the clock B, between the clock B and the clock C as well as between the clock C and the clock D.

9. The encryption and decryption processing method for implementing SMS4 algorithm in high-efficiency according to claim 6, wherein a phase differences between the clock A and the clock B, between the clock B and the clock C as well as between the clock C and the clock D are equal to each other.

10. The encryption and decryption processing method for implementing SMS4 algorithm in high-efficiency according to claim 6, wherein a phase differences between the clock A and the clock B, between the clock B and the clock C as well as between the clock C and the clock D are 90 degree.

11. The encryption and decryption processing method for implementing SMS4 algorithm in high-efficiency according to claim 3, wherein a phase difference between the clock A and the clock D is 180 degree.

12. The encryption and decryption processing method for implementing SMS4 algorithm in high-efficiency according to claim 7, wherein a phase differences between the clock A and the clock B, between the clock B and the clock C as well as between the clock C and the clock D are 90 degree.

* * * * *